United States Patent Office 3,491,624
Patented Jan. 27, 1970

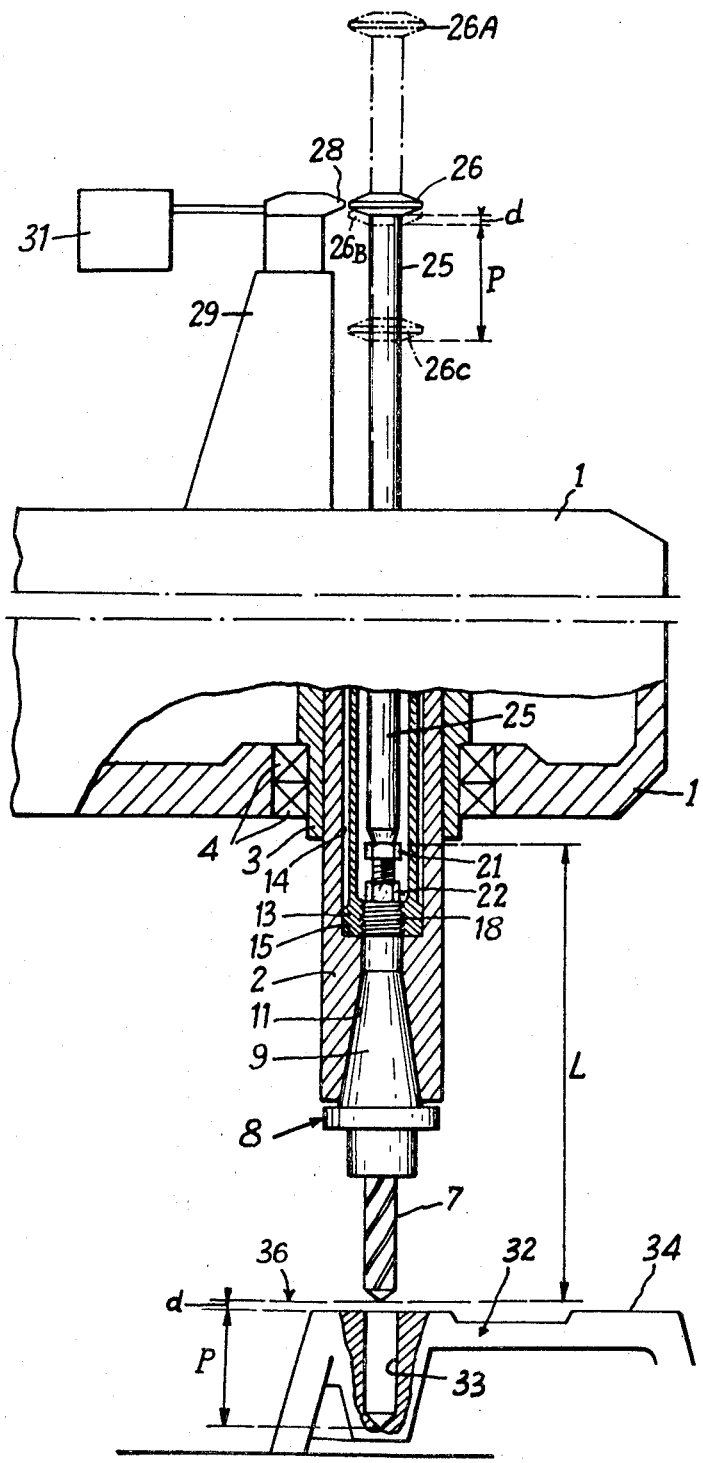

3,491,624
TOOL DEPTH CONTROL DEVICE
René Poincenot, Paris, France, assignor to Societe
Anonyme dite: Ratier-Forest, Paris, France
Filed Dec. 22, 1967, Ser. No. 692,782
Claims priority, application France, July 13, 1967,
114,189
Int. Cl. B23b 39/10, 47/18
U.S. Cl. 77—32.1                                              1 Claim

ABSTRACT OF THE DISCLOSURE

The invention relates to an improvement in automatic machine-tools with tool-changers and numerical control, wherein the end portion of each tool-carrier adapted to be introduced into the nose of the machine spindle is provided with an adjustable axial abutment in such a manner that it is possible to adjust the over-all length of the assembly formed by the tool-holder and the tool mounted therein to a constant value which is the same for all the tool holders of the machine, while a rod located in the bore of the machine spindle has one end resting upon said adjustable abutment and the other end carrying a flag which is movable in front of a stationary index secured to the headstock in which the spindle is mounted, said flag and index forming together a proximity abutment device adapted to emit a signal to be transmitted to the numerical control installation of the machine.

---

In a general manner, in automatic numerical control machine-tools fitted with tool-changers, the schedule of a work is effected in such a manner that the reference for the machining depths is constituted by the front end face of the machine spindle adapted to receive successive tool-carriers each fitted with a tool adapted to carry out a predetermined machining operation, such as truing a face or drilling a hole, for instance.

In order to take the wear of the tools into consideration, two methods are generally resorted to. The first method consists in providing means for axially adjusting the position of the tool in its carrier so that the tool protrudes a predetermined distance beyond the front end face of the tool-carrying spindle. The second method consists in providing tool length correction counters adapted to act upon the machine electronic control system which operates in response to a perforated program band.

However, both methods have drawbacks, namely—for the first: lack of accuracy in the axial position of the tool-carrier in the spindle and requirement for an axially adjustable tool to have a sort of "follow card" which determines the quantity the tool is proud of its axial reference position in the spindle; for the second: necessity of adjusting each of the counters (the number of which generally corresponds to the number of the tools in the tool storage magazine) by the difference between the theoretical length of the tool and its actual length, and furthermore necessity of zero resetting the counters each time the kind of workpiece to be manufactured is being changed, i.e. each time the perforated band is being changed, and also reintroducing the corrections applied to each of the tools which are necessary for affecting the new sequence of machining operations.

The object of the invention is to provide an automatic machine which has not the aforesaid drawbacks of the conventional machines.

To this aim, according to the invention, each tool-carrier is provided, at the end thereof adapted to be introduced into the machine spindle, with an adjustable abutment, in such a manner that it will be possible to adjust the over-all length of the assembly formed by the tool-carrier and the tool mounted therein, to a constant value which is the same for all the tool carriers of the machine, while one end of a rod which is arranged in the bore of the tool-carrying spindle rests against the aforesaid adjustable abutment and the other end of said rod carries a "flag" which travels in front of an outer reference index carried by the headstock in which the spindle is mounted, said flag and index forming an assembly which is called "proximity abutment" adapted to transmit a signal each time the flag passes exactly in register with the index, said signal being conducted to the installation for the numerical control of the machine.

By virtue of this particular arrangement, the operation of individually pre-adjusting the tools is considerably simplified since it merely consists in adjusting the axial abutment of the tool-carrier to a constant distance from the end of the tool mounted in the tool-carrier involved. Furthermore, when the spindle assumes the axial position in which the flag is exactly in register with the stationary index, the tip of any tool mounted in the spindle nose is located in a theoretical reference plane from which all the spindle feeds are counted for any machining program.

In practice, it is beneficial to locate said reference plane somewhat above the workpiece so as to avoid the tools running the risk of scratching the workpiece in the course of the preparation for the various sequences. There is thus formed a "safety gap" which is taken into consideration while the perforated program band is being established. Furthermore, it will be appreciated that the aforesaid correction counters may be dispensed with and that the work for preparing the program band is greatly simplified.

The invention will be better understood upon reading the following description supported by the accompanying drawing the only figure of which shows, partially in section, one embodiment of spindle and tool carrier arrangement in an automatic machine according to the invention.

The machine of which the tool-carrynig headstock is only partially shown as at 1 in the drawing, is a vertical milling machine. The rotary tool-carrying spindle 2 is slidably mounted in a rotary sleeve 3 arranged in the headstock in any suitable conventional manner, for instance by means of antifriction bearings 4 and it is rotatably driven by conventional means (not shown).

Each tool, for example a milling cutter, or as shown a drill 7, is secured in one end of a tool-carrier designated as a whole as at 8 and having a shank, for instance a taper shank 9 set into a corresponding conical bore 11 in the spindle nose and maintaining pressed against it by any suitable means shown in the example as a screw-threaded sleeve 13. This sleeve is adapted to rotate in a bore 14 of the tool-carrying spindle 2 and it bears against a shoulder 15 of said spindle. Its screw-threaded part is engaged upon the other end of the tool-carrier 8 so that rotating the screw-threaded sleeve 13 within the spindle 2 causes a traction effort to be exerted upon the shank of the tool-carrier whereby said tool-carrier is suitably clamped within the taper bore 11 of the spindle nose.

The inner end of the tool-holder 8 is provided with an adjustable axial abutment constituted, in this example, by the head of a bolt 21 which is engaged in an axial screw-threaded hole of said end of the tool-carrier and provided with a safety nut 22.

Arranged in the bore of the spindle 2 is a rod 25 which in this example is a cylindrical steel rod the lower end of which rests upon the head of the adjustable abutment bolt 21 of the tool-holder. The other end of the rod 25 carries a "flag" 26 constituted, for instance, by a collar formed on said end of the rod outside the headstock 1, that is to say above said headstock in this example.

While the spindle 2 is sliding vertically in its sleeve the rod 25, therefore, assumes the same vertical displacements in the course of which the flag 26 passes in register with a stationary outer index 28 carried by a support 29 secured on top of the headstock 1.

The set formed by the flag 26 and the stationary outer index 28 forms a so-called "proximity abutment system," i.e. these two member are so designed and arranged that each time the flag passes exactly in register with the stationary index the latter emits a signal which is transferred to the numerical control installation designated here as a whole by 31. To this aim, the proximity abutment system is of any suitable conventional type, for instance magnetic or optical, and it is adapted to initiate the electronic counting of the tool-carrying spindle feeds for an arcuate level of said spindle with a precision of $\frac{1}{100}$ mm. for instance.

By way of example, there is partially shown a workpiece 32, in which a hole 33 is to be drilled and the upper face 34 trued, for instance.

The operation of the whole is as follows:

When the tool is being replaced, the spindle 2 is generally in its uppermost position in which the flag 26 assumes for instance the position indicated in chain dotted lines at 26A.

For a machining cycle of a workpiece 32, the workpiece is given relatively to the headstock 1 a position such that upon the flag 26 being exactly in register with the stationary index 28, the end of the tool involved (in this instance the end of the drill 7) is located in a theoretical plane 36 positioned a short distance $d$ above the upper face 34 of the workpiece, for example a few millimeters, so as to provide for a safety gap or clearance. For all the machining operations carried out on the workpiece 32, counting the spindle feeds is effected from the axial position of the spindle 2 in which the flag 26 assumes the position represented in solid lines, at 26, and exactly in register with the stationary index 28. Thus, for a drilling depth P of the hole 33, the flag 26 will move downwardly by the distance $P+d$ from the position 26 to the position 26C.

By virtue of the principle of the device, the overall length of each tool-holder fitted with a tool, i.e. the length from the tip of the tool to the bearing face of the adjustable abutment 21 is a constant and equal to L. As a result, for instance upon truing the face 34 of the workpiece the spindle 2 and the milling cutter will assume the correct position at the moment when the flag is in position 26B located a distance $d$ below position 26 shown in full lines.

In a general manner, counting the depth feeds will always be carried out from the reference plane 36 in correspondence with the flag 26 being in register with the stationary index 28 and the program band is established taking into consideration the safety gap $d$ which avoids the tips of the tools scratching the upper face of the workpiece in the course of the preparation for the various sequences.

It may happen that some tools do not allow the assembly formed by the tool-holder and the tool to have a length equal to L. Then, another reference length is to be selected and taken into consideration when establishing the program band; however the principle of the above described arrangement remains unchanged.

Of course, the invention is not limited to the embodiment described and represented, many modifications may be brought thereto without departing from the scope of the invention.

What I claim is:

1. For an automatical numerical controlled machine-tool, a numerical control installation, a headstock, a sleeve rotatably mounted in said headstock, a tubular tool-carrying spindle slidably mounted in said sleeve but angularly fixed relative thereto and having one end portion protruding out of said headstock, an elongated tool-holder adapted to be secured in said end portion of said tool-carrying spindle and having an outer end and an inner end, a cutting tool mounted in said outer end of said tool holder, an adjustable axial abutment mounted in said inner end of said tool-holder, the over-all length of the assembly formed by said tool-holder with said abutment and said cutting tool mounted in said tool holder having a predetermined constant value, a rod freely threaded in said tubular tool-carrying spindle and having one end adapted to rest on said adjustable abutment when said tool-holder is secured in said spindle while the other end of said rod protrudes out of said headstock, a flag secured to said other end of said rod, and a stationary index carried by said headstock close to the path of travel of said flag when said rod is moved axially together with said spindle, said flag and index forming together a proximity abutment device adapted to emit a signal to be transmitted to said numerical control installation.

References Cited

UNITED STATES PATENTS 3,209,222    9/1965    Holy.
3,136,563    6/1964    Swanson et al. _____ 279—1

FRANCIS S. HUSAR, Primary Examiner

U.S. Cl. X.R.

29—568; 90—11, 13; 318—162